Oct. 5, 1965　　　T. R. MILES　　　3,209,890
FEEDING APPARATUS
Filed Oct. 18, 1962　　　　　　　　　　　　　　4 Sheets-Sheet 1
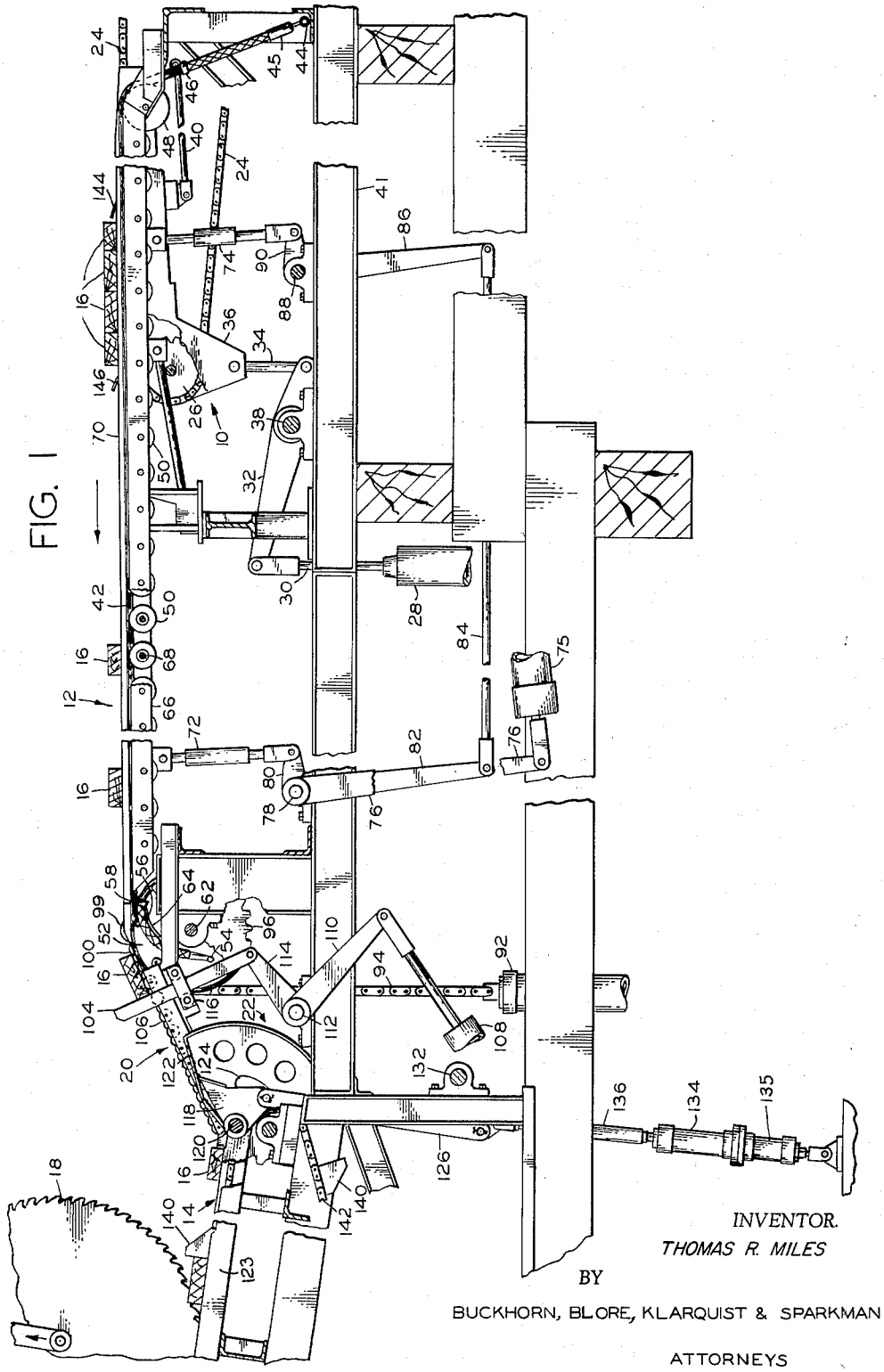
FIG. I
INVENTOR.
THOMAS R. MILES
BY
BUCKHORN, BLORE, KLARQUIST & SPARKMAN
ATTORNEYS Oct. 5, 1965   T. R. MILES   3,209,890
FEEDING APPARATUS
Filed Oct. 18, 1962   4 Sheets-Sheet 2
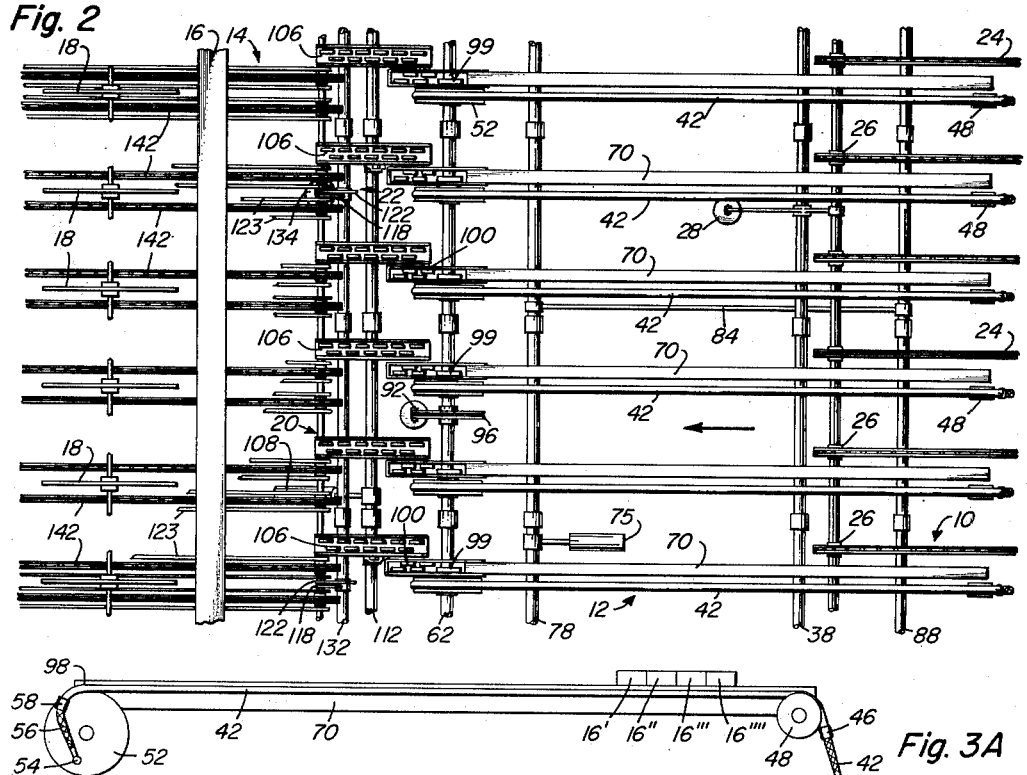
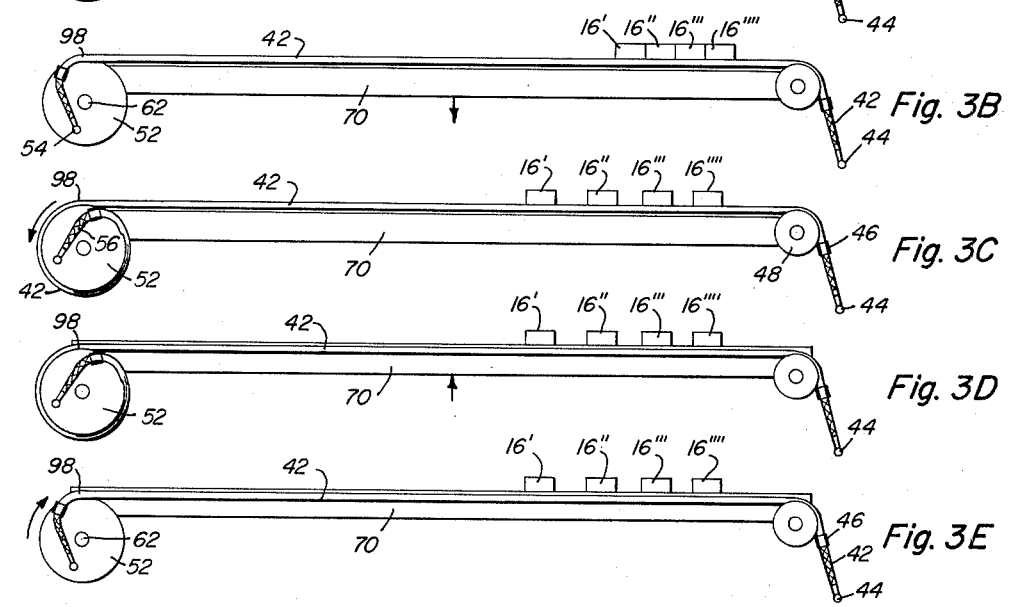
THOMAS R. MILES
INVENTOR.
BY
BUCKHORN, BLORE, KLARQUIST & SPARKMAN
ATTORNEYS Oct. 5, 1965

T. R. MILES 3,209,890

FEEDING APPARATUS

Filed Oct. 18, 1962

INVENTOR.
THOMAS R. MILES
BY
BUCKHORN, BLORE, KLARQUIST & SPARKMAN
ATTORNEYS

Oct. 5, 1965     T. R. MILES     3,209,890
FEEDING APPARATUS

Filed Oct. 18, 1962     4 Sheets-Sheet 4

INVENTOR.
THOMAS R. MILES
BY
BUCKHORN, BLORE, KLARQUIST & SPARKMAN
ATTORNEYS

United States Patent Office 3,209,890
Patented Oct. 5, 1965

3,209,890
FEEDING APPARATUS
Thomas R. Miles, 5475 SW. Arrowood, Portland, Oreg.
Filed Oct. 18, 1962, Ser. No. 231,391
11 Claims. (Cl. 198—34)

The subject matter of the present invention relates generally to material handling apparatus, and in particular to a feeder apparatus in which a conveyor having one or more resilient members is employed to separate or to compact articles placed on such conveyor and to transport such articles along such conveyor, and in which an orientation device is employed to turn such articles over from one side to the other in order to change the orientation of such articles.

The feeding apparatus of the present invention is especially useful as a lumber feeder for transporting boards to trimmer saws in a lumber mill for the removal of defective portions of such boards. The present feeding apparatus has several advantages over conventional lumber feeders, including the fact that it is capable of handling a greater variety of boards of random width and length and having unfinished edges without jamming. Another advantage of the present feeding apparatus is that it performs the several functions of conveying, separating or compacting, and orientation of the boards or other articles substantially entirely automatically so that it requires a minimum of manual operation. A further advantage of the present feeding apparatus is its relatively simple structure which enables trouble-free operation for extended periods of time with little maintenance. In addition, the separating conveyor of the present invention transports, and separates or compacts articles at a faster rate of speed than conventional feeding apparatus because the separation or compacting of the articles takes place during transportation of such articles.

It is therefore one object of the present invention to provide an improved material handling apparatus.

Another object of the present invention is to provide an improved conveyor apparatus which is capable of separating or compacting articles placed on such conveyor apparatus while it is transporting such articles from one place to another.

A further object of the present invention is to provide an improved lumber feeding apparatus which automatically separates boards placed on such feeder apparatus while it is conveying such boards from one location to another and which is also capable of automatically changing the orientation of such boards by turning them over from one side to the other when desired.

Still another object of the present invention is to provide a separating conveyor which is capable of separating and transporting articles of random width and length at a rapid rate of speed.

A still further object of the invention is to provide an improved separating conveyor in which one or more resilient members are employed to separate and transport articles placed on such conveyor by alternately stretching and relaxing such resilient members and by allowing such articles to move with the resilient members only during stretching.

An additional object of the present invention is to provide an improved lumber feeder apparatus of a simple cconstruction which requires little maintenance for proper operation.

Another object of the invention is to provide an improved compacting conveyor in which one or more resilient members are employed to compact and transport articles by alternately stretching and contracting such resilient members and by allowing such articles to move with the resilient members only during contraction.

Still another object of the invention is to provide an improved orientation device for turning articles over from one side to another in order to change the orientation of such articles.

Other objects and advantages of the present invention will be apparent from the following detailed description of a preferred embodiment thereof and from the attached drawings of which:

FIG. 1 is a side view of the preferred embodiment of the feeding apparatus of the present invention with parts broken away for clarity;

FIG. 2 is a schematic plan view of the feeding apparatus of FIG. 1;

FIGS. 3A, 3B, 3C, 3D and 3E are schematic views of one of the separating conveyors employed in the feeder apparatus of FIGS. 1 and 2 each showing a different step in the operation of such separating conveyor;

Figure 4:
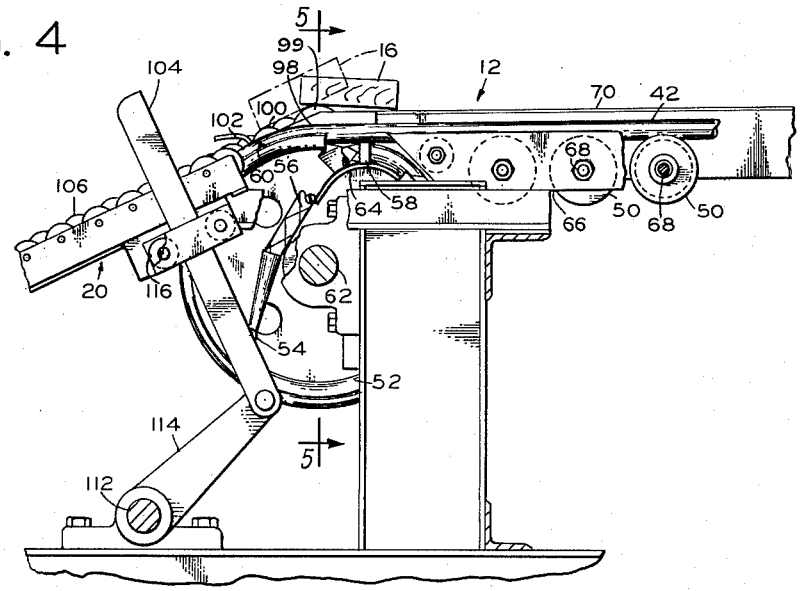
FIG. 4 is an enlarged view of a portion of the feeder apparatus of FIG. 1.

A preferred embodiment of the feeding apparatus of the present invention is shown in FIGS. 1 and 2 to include a loading conveyor 10, a separating conveyor 12, and a discharge conveyor 14 which transports boards 16 through a plurality of adjustable trimmer saws 18 in a manner hereafter described. The separating conveyor 12 and the discharge conveyor 14 are connected by a plurality of discharge ramps 20 which are positioned to allow the boards 16, to move down from the separating conveyor onto the discharge conveyor after being separated on such separating conveyor to increase the spacing between such boards. An orientation device 22 is mounted adjacent the bottom of one or more of the discharge ramps 20 for turning over the boards from one side to the other when it is desired to reverse the orientation of the top and bottom sides of the board, for example, when the operator thinks there are defects in the normally hidden side of such board. After observing the board for flaws, the operator lowers one or more of the trimmer saws 18 into cutting position and such board is trimmed to a standard length as it is carried through such saws by the discharge conveyor 14.

The loading conveyor 10 may be any conventional conveying apparatus, such as one employing a plurality of endless conveyor chains 24 which pass over sprockets 26 at the opposite ends of such loading conveyor. The output end portion of the loading conveyor 10 overlaps the input end of the separating conveyor 12 and the upper surface of such loading conveyor is periodically lowered below the upper surface of the separating conveyor 12 in order to deposit a group of boards 16 transported to the output end of such loading conveyor, onto the separating conveyor. After these boards having been transported by the separating conveyor out of the way of the loading conveyor, such loading conveyor is raised to allow more boards to be transported to the output end thereof. This may be accomplished by an actuating mechanism for the loading conveyor including a hydraulic cylinder 28 whose piston rod 30 is pivotally secured to one end of a lever arm 32 fixed to a shaft 38 and having its other end pivotally attached to a connecting rod 34 which is secured to one of a plurality of frames 36 which support the loading conveyor. The shaft 38 supports a plurality of lever arms and connecting rods connected to the conveyor frame 36 so that when the cylinder 28 is actuated, the lever arm 32 pivots shaft 38 to move all of the connecting rods 34 coupled to such shaft to raise or lower the loading conveyor 10 at the proper time. In order to prevent longitudinal movement of the loading conveyor 10 a drag link 40 is pivotally attached at one end thereof to the conveyor frame 36 and at the other end thereof to a fixed frame structure.

Figure 5:
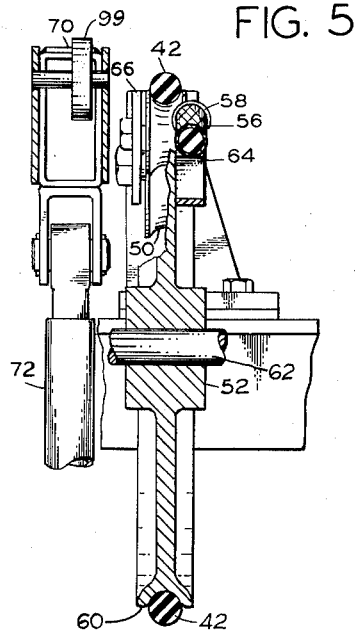
FIG. 5 is a vertical section view taken along the lines 5—5 of FIG. 4.

The separating conveyor 12 includes a plurality of resilient members 42 which may be in the form of long bands of strips of rubber, or other suitable elastic material, having a circular cross section. However, it is obvious that other resilient members can be employed which do not use elastic material, such as coil springs or the like. As best shown in FIG. 1, each of bands 42 is anchored to a frame upright by means of a cable snare 45 clamped to the band by a clamp 46 and secured to the upright by an anchor 44. Each rubber band 42 extends over a grooved idler pulley or sheave 48 and along the top of guide elements comprising a plurality of aligned, paraffin impregnated rubber guide rollers 50 to a grooved drive wheel or sheave 52 mounted in a transversely extending drive shaft 62. Each band 42 extends into the groove of the corresponding sheave 52 and is led through a cutout portion of the sheave flange to a point 54 on the side of the drive sheave where it is secured by means of a cable snare 56, as shown in FIGS. 4 and 5, which is secured to the band by a clamp 58. An arcuate guide element 64 is welded to the side of the sheave 52 to maintain the end of the rubber band 42 in proper position. The guide rollers 50 rotate upon axes 68 supported from a pair of support members 66. Preferably the rubber bands 42 are pretensioned as they are installed, rigidly attached to the frame 41.

The separating conveyor 12 also includes a plurality of jump skids 70 positioned one adjacent each of the rubber bands 42. Each jump skid may be in the form of an elongated, hollow, rectangular beam which is supported substantially horizontally on a pair of connecting rods 72 and 74 pivotally attached one adjacent each of the opposite ends thereof. Each jump skid 70 extends substantially horizontal but with a slight downward slope and parallel to the adjacent rubber band 42 from a point slightly ahead of the idler pulley 48 to a point slightly behind the drive sheave 52. The jump skids are adapted to be reciprocated up and down so that the upper surfaces of the jump skids alternately rise above the upper surface of the rubber bands 42 and then drop below the upper surfaces of such bands. This reciprocation is accomplished by means of a hydraulic cylinder 75 whose piston rod is pivotally attached to one end of a lever 76 having its other end rigidly attached to a shaft 78 extending transversely of the conveyor 12. The connecting rod 72 for each jump skid is pivotally attached at its lower end to a lever arm 80 which is rigidly secured to the shaft 78 for rotation with such shaft. A connecting link 82 is rigidly secured at one end to shaft 78 and pivotally attached at its other end to a connecting rod 84 whose other end is pivotally attached to a second connecting link 86. The second connecting link 86 is rigidly secured to a shaft 88 so that such second shaft rotates with the shaft 78. The shaft 88 extends transversely of the conveyor 12 and has fixedly secured thereto a plurality of crank arms 90 to which are pivotally attached the lower end of the connecting rods 74. Thus, when the cylinder 75 pivots the lever arm 76 causing the shafts 78 and 88 to rotate back and forth, the connecting links 72 and 74 cause the jump skids to move alternately up and down.

While the jump skids 70 are reciprocating up and down, the resilient bands 42 are stretched to lengthen such members and then allowed to relax to return them to their normal length by oscillating the drive sheaves 52 in synchronism with the reciprocation of the jump skids. In order to provide the drive sheaves 52 with an oscillating rotational movement on the drive shaft 62, a hydraulic cylinder 92 is periodically activated by a hydraulic circuit (not shown) to rotate such drive shaft back and forth.

The piston rod of the cylinder 92 is connected to the end link of a chain 94 which extends over the teeth of a sprocket wheel 96 rigidly secured to the shaft 62. The other end of the chain 92 is rigidly anchored to the sprocket 96 so that a downward movement of the piston rod of cylinder 92 causes the sprocket 96 to rotate in a counterclockwise direction through an angle less than 360°, for example 320°, thus rotating the shaft 62 and the drive sheave 52. This causes a portion of the rubber bands 42 to wind about the drive sheaves and stretches such bands. Of course, when the piston rod of cylinder 92 moves upwardly, the energy stored in the rubber bands 42 during stretching causes the bands to contract and to rotate the drive sheaves 52 in a clockwise direction along with the shaft 62 and the sprocket 96 until all of the slack in the chain 94 is taken up.

The operation of the separating conveyor 12 is best illustrated with reference to FIGS. 3A, 3B, 3C, 3D and 3E which show schematically a different step in such operation. As shown in FIG. 3A in its relaxed position, each rubber band 42 extends for a short distance along the periphery of the corresponding sheave 52 before it leaves the periphery and extends across the guide element 64 to the anchor point 54. In this relaxed position the adjacent jump skid 70 is raised above the upper surface of the rubber bands 42 so that boards 16′, 16″, 16‴, 16⁗ loaded on the separating conveyor 12 by the loading conveyor 10, are deposited on the upper surface of the jump skids. Next, the jump skids 70 drop below the upper surface of the rubber bands 42 so that the boards 16 on such jump skids are transferred to and supported on the bands, as shown in FIG. 3B. Then the drive sheaves 52 are rotated counterclockwise, as shown in FIG. 3C, to stretch the bands 42 by winding a portion of the bands about the sheaves. It should be noted that while no overwrapping of the rubber bands is shown, this may be accomplished by rotating the drive sheave through more than 360° to provide greater stretching. Since tension is applied only to that portion of a band 42 which is between and free of engagement with the sheave 52 and pulley 48, stretching only occurs in such portion of the band and winding of the band upon the sheave 52 in effect causes the same to shorten. Thus, the rotational movement of the sheaves 52 has an accelerating effect upon the stretching movement of the bands 42. To put it another way, the winding of a rubber band 42 upon a sheave 52 causes the point of application of tension force 98 progressively to move along the band away from the end fixed to the sheave. The stretching of the bands 42 causes the boards 16 supported thereon to separate and increases the spacing between the boards because such boards move with the rubber bands 42 toward the sheaves 52. Because the amount of stretching of any portion of a band is inversely proportional to the distance of such portion from the sheave 52, the board 16′ nearest the sheaves moves a greater distance toward the sheaves than those further away. Thus, as shown in FIG. 3C, the spacing produced between the first 16′ and second boards 16″ is greater than the spacing between the second 16″ and third boards 16‴. Likewise the spacing between the latter boards is greater than between the third board 16‴ and the fourth board 16⁗.

After a stretching step, the jump skids 70 again rise above the upper surface of the bands 42 to remove the boards 16 from the bands while the bands remain in a stretched condition as shown in FIG. 3D. After the boards 16 are removed from the bands 42, the drive sheaves 52 are permitted to rotate in a clockwise direction whereupon the bands 42 contract to their normal length as shown in FIG. 3E. This completes one cycle of operation and another one begins immediately further to separate the boards and to move them closer to the sheaves 52. The sequence is continued until the boards 16 are transported to the discharge end of the conveyor 12.

Mounted upon the tail ends of the jump skids 70 are hump wheels 99 which move with such jump skids alternately above and below the upper surface of the rubber bands 42. The hump wheels 99 protrude a short distance above the upper surface of the jump skids 70, as shown in FIG. 4, so that where the jump skids are raised above the bands 42 any board overlying the wheels 99 with its center of gravity behind the hump wheels will either be supported on the wheels and skids or slide back onto the skids. However, if the center of gravity of the boards is beyond the hump wheels, the board will tip over the wheels and slide down a slope formed by a plurality of rollers 100. The rollers 100 are also attached to the front end of such jump skids but are of a smaller diameter than the hump wheels 99. A switch 102 connected to operate the cylinder 75 may be positioned to be depressed by the board 16 as it slides down the rollers 100 and to stop the reciprocation of the jump skids 70 in their upper position so that no more boards are fed over the hump wheels 99 until such switch is released. This prevents jamming and allows the boards to be processed individually after leaving the separating conveyor 12. If the hump wheels were not present, one end of an askew board could close the switch 102 and stop movement of the jump skid before the other end of the board leaves the jump skid, thereby preventing the board from sliding down rollers 100 to open the switch so that the operation of the separating conveyor would stop.

A plurality of stop bars 104 are secured to some of the discharge ramps 20 which transmit the boards 16 from the separating conveyor 12 to the discharge conveyor 14. These stop bars allow any askew boards 16 to become aligned with their front edges lying against such stop bars before proceeding down the discharge ramps on a plurality of rollers 106 forming the upper surface of such ramp. The stop bars 104 are moved up by a hydraulic cylinder 108 from a retracted position shown in FIG. 6 below the upper surface of rollers 106, to the extended position shown in FIG. 4 above such upper surface. The piston rod of the cylinder 108 is pivotally attached to one end of a lever arm 110 whose other end is rigidly secured to a transversely extending shaft 112 for rotation of such shaft. A plurality of lever arms 114 are rigidly attached to the shaft 112, and pivotally attached one to each of the stop bars 104. The stop bars 104 slide within guide elements 116 and may be moved between the extended and retracted positions thereof when the cylinder 108 is actuated.

Figure 6:
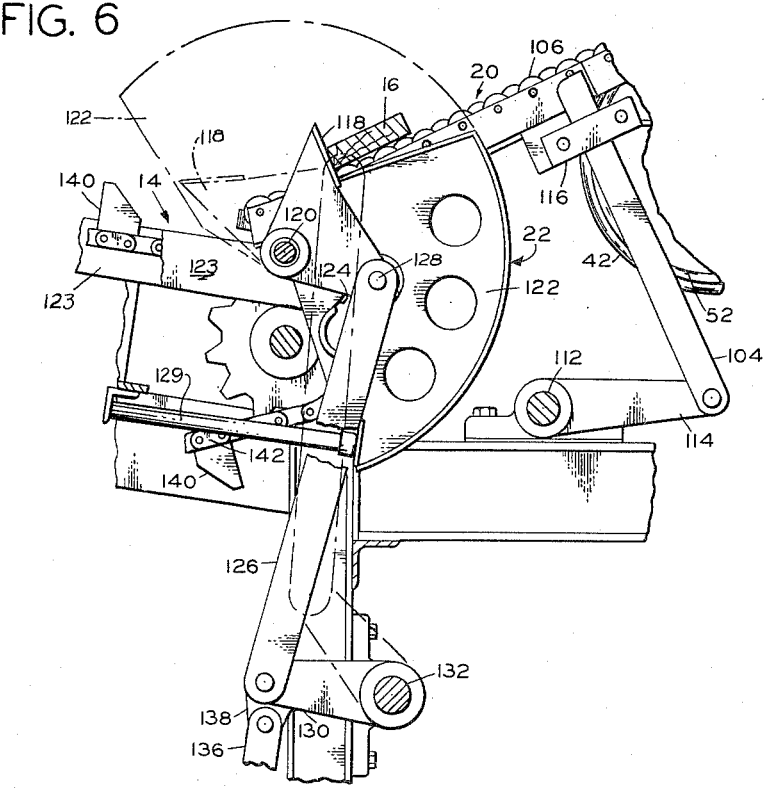
FIG. 6 is an enlarged view of a portion of the feeding apparatus showing one position of the orientation device employed in such apparatus.

The orientation devices 22 positioned adjacent the bottom of some of the discharge ramps 20 each include a stop plate 118 of a generally triangular shape which is pivotally mounted at one corner thereof on a short shaft 120, and a flipper member or plate 122 in the form of a circular segment which is also pivotally mounted on such shaft adjacent the center of curvature of such segment. Each of the shafts 120 is mounted between a pair of runners 123 positioned on opposite sides of the conveyor chains of the discharge conveyor 14. The runners 123 have their upper surface above the conveyor chains, so that the boards are moved on such runners by such chains in a manner hereafter described. The flipper plate 122 is provided with an arcuate slot 124 through such flipper plate between the arcuate outer surface of the segment and the axis of rotation thereof, as shown in FIG. 6. A connecting link 126 is pivotally attached to another corner of the stop plate 118 by means of a pivot pin 128 which extends through the slot 124 in the flipper plate so that it may engage the ends of such slot to pivot the flipper plate 122 about the shaft 120 from the retracted position shown in solid lines in FIG. 6 determined by a limit stop 129 engaging such flipper plate to the extended position shown in dashed lines. The other end of the connecting links 126 of each flipper plate is pivotally attached to one of a plurality of lever arms 130 which are keyed to a transverse shaft 132 for rotation with such shaft. The shaft 132 is pivoted by a pair of tandem air cylinders 134 and 135 attached to one end of a connecting rod 136 having its opposite end pivotally secured to an extension 138 of one of the lever arms 130.

Figure 7:
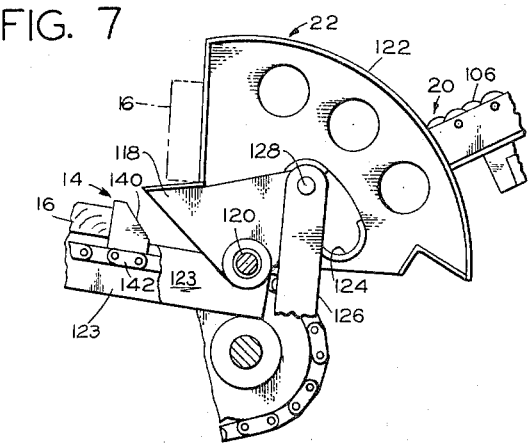
FIG. 7 is an enlarged view similar to FIG. 6 showing another position of the orientation device.

In the position shown in FIG. 6, the stop plate 118 has been rotated by shaft 120 so that the third corner of such stop plate extends above the surface of the rollers 106 to prevent further movement of the boards 16 down the ramp 20. This positioning of the stop plate 118 is effected by operation of the cylinder 134 by the operator of the feeder apparatus to extend its piston rod. After the board 16 has been stopped by the stop plate 118, the cylinder 135 is activated to extend the piston rod of such cylinder so that the upper cylinder 134 and the connecting rod 136 move upward with such piston rod and the pivot pin 128 engages the upper end of the slot 124 to rotate the flipper plate 122 up into engagement with the bottom of the board 16. As shown in FIG. 7, the stop plate 118 rotates until its stop surface is out of the way of the board 16 and then such stop plate and the pivot pin 128 discontinue their rotation. However, the flipper plate 122 has an "over travel" and continues to rotate from the position shown in FIG. 7 due to inertia until the bottom end of the slot 124 engages the pivot pin 128 to stop rotation of the flipper plate. Thus, the flipper plate throws the board 16 from the surface of such flipper member onto the discharge conveyor 14 after turning such board over from one side to the other so that the upper and lower sides of the board are reversed. The lugs 140 of the conveyor chains 142 of the discharge conveyor 14 then engage the board and transport the board upon the runners 123 to the trimmer saws 18. It should be noted that the orientation devices 22 are not operated automatically, but are only actuated by the operator of the feeding apparatus when he wishes to see the hidden lower surface of such board.

As has been indicated previously, the separating conveyor 12 can be used for compacting articles, as well as for separating them, merely by loading the articles to be compacted onto the rubber bands 42 adjacent the drive sheaves 52 and reversing the operating procedure of FIGS. 3A to 3E. Thus, the jump skids 70 would lower the articles onto the rubber bands 42 after stretching of such bands, but before contraction thereof. The bands would then be allowed to relax causing the articles to move closer together and to be transported to the right in FIG. 1 toward the fixed ends of the rubber bands adjacent the idler pulleys 48. Next the jump skids would be raised to lift the articles off the bands and the bands are again stretched. This cycle would be repeated, whereupon the articles would be conveyed to the right and simultaneously compacted.

Automatic operation is achieved by means of a master timing device (not shown) which is controlled by a timing cam on the sprocket shaft of conveyor chain 142. The boards or other articles are delivered to the separating conveyor 12 across a limit switch 144 which extends above the upper surface of the loading conveyor 10. Release of this switch causes the loading conveyor to lower the boards onto the separating conveyor. These boards are then transported by the separating conveyor 12 across a limit switch 146 which extends above the upper surface of such separating conveyor. When the boards clear the extended arm of this limit switch 146 to release such switch, the loading conveyor cam rises to enable delivery of another group of boards to the separating conveyor. The separating conveyor reciprocates at about 30 cycles per minute independently of the master timer and continues to operate until the limit switch 102 adjacent stop bars 104 is tripped. This stops the jump skids 70 in their up position and holds them there until the switch 102 is cleared. The stop bars 104 are controlled by the master timer so that they do not release the board by dropping below the surface of ramp 20 until the chain lugs 140 are in position to allow the board to land on the discharge conveyor runners 123 between consecutive lugs. Then the stop bars 104 rise to their normal up position and the jump skids begin to reciprocate again. As has been previously discussed, the operation of the orientation device 22 is manually controlled by the operator to properly coincide with the continuing operation of the automatic cycle.

Of course, the feeder apparatus of the present invention can be employed for separating or compacting other articles than lumber, such as boxes, cans or other containers. In addition, a second set of resilient members can be used in place of the jump skids 70 to remove the articles off of the rubber bands 52 and to redeposit them. This second set of rubber bands would be raised above and lowered below the other set of rubber bands, in the manner of the jump skids 70 and also stretched and relaxed in the manner of the rubber bands 52 previously discussed. The addition of a second set of rubber bands would allow a continuous operation of separation or compaction, and simultaneous transportation so that the feeder apparatus will operate at an even faster rate of speed than when one set of rubber bands is employed. Of course, air cylinders may be used in place of the hydraulic cylinder and vice versa.

It will be obvious to those having ordinary skill in the art that various changes may be made in the details of the above-described preferred embodiment of the present invention without departing from the spirit of the invention. Therefore, the scope of the present invention should only be determined by the following claims.

I claim:

1. Feeder apparatus for transporting articles and for varying the spacing between said articles, comprising:
   a resilient member having a normal length which is substantially greater than the width of said articles;
   means for applying a tension force to said resilient member in order to stretch said resilient member to increase its length, and for decreasing said tension force to allow said resilient member to return to its normal length, so that portions of said resilient member move alternately in two opposite directions; and
   means for preventing the movement of said articles on said resilient member in one of said two opposite directions.

2. Feeder apparatus for transporting articles and for varying the spacing between said articles, comprising:
   a resilient member having a normal length which is substantially greater than the width of said articles;
   means for applying a tension force to said resilient member in order to stretch said resilient member to increase its length, and for decreasing said tension force to allow said resilient member to return to its normal length, so that portions of said resilient member move alternately in two opposite directions when the length of said resilient member changes with variations in said tension force; and
   means for removing said articles from said resilient member to prevent the movement of said articles on said resilient member in one of said two opposite directions and for placing said articles back on said resilient member to cause movement of said articles in the other of said directions and to cause the spacing of said articles to change with variations in the length of said resilient member.

3. Apparatus for feeding and transporting articles comprising:
   an elongate resilient member;
   means for securing one end of said member in a fixed position;
   means connected to the opposite end of said resilient member operable alternately to effect stretching and relaxing the movement of said resilient member;
   and means for arresting movement of articles positioned on said resilient member during one of said stretching and relaxing movements of said resilient member.

4. Apparatus for feeding and transporting articles comprising:
   an elongate, resilient member;
   means for securing one end of said resilient member in fixed position;
   stretching means connected to the opposite end of said resilient member operable periodically first to stretch and then to relax said resilient member;
   means to feed articles upon an end of said reslient member;
   and means operating in timed relation to said stretching means for periodically preventing movement of articles deposited upon said members.

5. Apparatus for feeding and transporting articles comprising:
   a horizontally disposed, elongate, resilient member;
   means for securing one end of said resilient member in a fixed position;
   stretching means connected to the opposite end of said resilient member operable periodically first to stretch and then to relax said resilient member;
   and means adjacent said resilient member operable alternately to elevate articles from said resilient member and to redeposit such articles thereupon in timed relation with said stretching means so that said articles are supported upon said resilient member during only one of the stretching and relaxing cycles thereof.

6. Apparatus for feeding and transporting articles comprising:
   a frame;
   a wheel rotatably mounted on said frame;
   a horizontally extending, elongate, resilient member having one end secured to said wheel;
   means for fixedly securing the opposite end of said resilient member to said frame;
   means for periodically rotating said wheel in a reciprocating manner first to wind a portion of said resilient member thereabout to apply a tension to said resilient member and stretch the same, and next to unwind said portion to relax said resilient member;
   and means operating in timed relation to said wheel rotating means operable alternately to elevate articles from said resilient member and to redeposit them thereupon so that said articles are supported upon said resilient member during only one of the stretching and relaxing cycles thereof.

7. Feeder apparatus for transporting elongated articles and for separating said articles, comprising:
   a resilient member of elastic material having a normal length which is substantially greater than the width of said articles;
   means for preventing movement of one end of said resilient member;
   means for loading said articles onto a portion of said resilient member adjacent said one end thereof;
   means for applying a tension force to said resilient member at the other end thereof in order to stretch said resilient member to increase its length, and for decreasing said tension force to allow said resilient member to decrease and return to its normal length, so that portions of said resilient member move in two opposite directions when the length of said resilient member changes with variations in said tension force; and
   means for preventing the movement of said articles with said resilient member during the return of said resilient member to its normal and for allowing movement of said articles with said resilient member during increases in the length of said resilient member to cause the spacing between said articles to increase with changes in the length of said resilient member and to transport said articles toward the said other end of said resilient member.

8. Feeder apparatus for transporting elongated articles and for compacting said articles, comprising:
- a resilient member having a normal length which is substantially greater than the width of said articles;
- means for loading said articles onto a portion of said resilient member adjacent one end thereof;
- means anchoring the opposite end of said resilient member against movement;
- means for applying a tension force to said resilient member at said one end in order to stretch said resilient member to increase its length, and for decreasing said tension force to allow said resilient member to decrease and return to its normal length, so that portions of said resilient member move in two opposite directions when the length of said resilient member changes with variations in said tension force; and
- means for preventing the movement of said articles with said resilient member during increases in the length of said resilient member and for allowing movement of said articles with said resilient member during decreases of its length to cause the spacing between said articles to decrease with changes in the length of said resilient member and to transport said articles along said resilient member toward the said opposite end thereof.

9. Lumber handling apparatus for transporting boards of random length and width and for varying the spacing between said boards, comprising:
- a support frame;
- a plurality of wheels rotatably mounted on said frame;
- a plurality of elongated resilient members, each of said resilient members having one end attached in a fixed position to said frame and extending from said one end along the path of said boards to one of said wheels where the other end of the resilient member is attached;
- means for rotating said wheels together in a reciprocating manner in order to wind a portion of said resilient members about said wheels to apply a tension force to the resilient members which stretches said resilient members to increase their length, and then to unwind that portion of the resilient members off of said wheels to reduce said tension force and allow the resilient members to return to their normal length, so that portions of said resilient members which will be in contact with said boards move in two opposite directions at different times; and
- means for preventing the movement of said boards on said resilient members in one of said two opposite directions to cause the spacing of said boards to vary with changes in the lengths of said resilient members and to transport said articles in the other of said two opposite directions along said resilient members.

10. Lumber handling apparatus for separating boards of random length and width and for transporting said boards, comprising:
- a support frame;
- a plurality of wheels rotatably mounted on said frame;
- a plurality of elongated resilient members, each of said resilient members having one end attached in a fixed position to said frame and extending from said one end along the path of said boards to one of said wheels where the other end of the resilient member is attached, a portion of each of said resilient members extending tangent to the wheel along the periphery of said wheel;
- a conveyor device for loading said boards onto said resilient members adjacent the fixed ends of said resilient members;
- means for rotating said wheels together in a reciprocating manner in order to wind a portion of said resilient members onto said wheels to apply a tension force to the resilient members at their point of tangency with said wheels which stretches said resilient members to increase their length, and then to unwind that portion of the resilient members off of said wheels to reduce said tension force and allow the resilient members to return to their normal length, so that portions of said resilient members which will be in contact with said boards move in two opposite directions at different times and the portions nearest the tangent point move a greater distance than those further away, said tangent point moving along said resilient members during the winding and unwinding of said resilient members about said wheels; and
- means for removing said boards from contact with said resilient members after said resilient members are stretched but before said resilient members return to their normal length, and for placing said boards back in contact with the resilient members after their return to normal length but before they are stretched again, in order to cause said boards to be separated by an amount which increases with each stretching of the resilient members and to transport said boards along said resilient member toward said wheels; and
- means for discharging said boards from said resilient members adjacent said wheels.

11. Lumber handling apparatus for separating boards of random length and width and for transporting said boards, comprising:
- a support frame;
- a plurality of guide elements mounted in groups of aligned elements on said frame;
- a plurality of sheaves rotatably mounted on said frame and positioned so that each of said sheaves are aligned with a different one of said groups of guide elements;
- a plurality of elongated resilient members of rubber, each of said resilient members having one end attached in a fixed position to said frame and extending from said one end along a group of said guide elements to the sheave which is in alignment with said group of elements, a portion of each of said resilient members extending tangent to the sheave and along the outer edge of said sheave to a place on said sheave where the other end of the resilient member is secured;
- a conveyor device for loading said boards onto said resilient members adjacent the fixed ends of said resilient members, including means for raising and lowering said conveyor device;
- means for rotating said sheaves together in a reciprocating manner in order to wind a portion of said resilient members onto the outer edge of said sheaves to apply a tension force to the resilient members at their point of tangency with said sheaves which stretches said resilient members to increase their length, and then to unwind that portion of the resilient members off of said sheaves to reduce said tension force and allow the resilient members to return to their normal length, so that portions of said resilient members which will be in contact with said boards move in two opposite directions at different times and the portions nearest the tangent point move a greater distance than those further away, said tangent point moving along said resilient members due to the winding and unwinding of said resilient members about said sheaves;
- means for removing said boards from contact with said resilient members after said resilient members are stretched but before said resilient members return to their normal length, and for placing said boards back into contact with the resilient members after their return to normal length but before they are stretched again, in order to cause said boards to be separated by an amount which increases with each stretching of the resilient members and to transport said boards along said resilient member toward said other end of said resilient members; and means for discharging said boards from said resilient members adjacent said other end of said resilient members.

References Cited by the Examiner

UNITED STATES PATENTS

| | | | |
|---|---|---|---|
| 2,527,024 | 10/50 | Mitchell | 198—33 |
| 2,745,535 | 5/56 | Schlegel | 198—33 |
| 2,769,522 | 11/56 | Pfeiffer | 198—34 |
| 2,801,727 | 8/57 | Malnati | 198—34 |
| 3,024,890 | 3/62 | Belk | 198—34 |

SAMUEL F. COLEMAN, *Primary Examiner.*

EDWARD A. SROKA, *Examiner.*